May 19, 1964 M. C. DICKMAN 3,133,992

AUTOMATIC ANSWERING, RECORDING AND REPRODUCING MACHINE

Filed Oct. 13, 1958 3 Sheets-Sheet 1

Inventor
M. C. Dickman
By Mason, Downing & Seebold
Attys.

Inventor
M. C. Dickman
By Hancock Downing & Seebold
Attys.

Inventor
M. C. Dickman
By Glascock Downing & Seebold
Attys.

United States Patent Office 3,133,992
Patented May 19, 1964

3,133,992

AUTOMATIC ANSWERING, RECORDING AND REPRODUCING MACHINE

Matthew C. Dickman, 8 Highland House, 173 Louis Botha Ave., Orange Grove, Johannesburg, Transvaal, Republic of South Africa Filed Oct. 13, 1958, Ser. No. 766,735
9 Claims. (Cl. 179—6)

This invention relates to apparatus for recording telephone messages. While as a general rule the apparatus will be associated with telephones, the invention is also directed to apparatus designed to record messages through channels other than telephone lines, and where phrases such as "telephone channel" appear they are to be given the extended meaning intended. In addition, the invention covers reproducing apparatus for replaying a recorded message to a remote receiver.

It is an object of the present invention to provide a novel telephone answering machine.

It is a further object of the invention to provide a telephone answering machine which is responsive only to syllabic signals, i.e. speech, ringing current or the like, and not to continuous signals.

It is a further object of the invention to provide a telephone answering machine in which recorded messages may be reproduced to a remote receiver in a novel manner.

Also, according to the invention, the reproducing apparatus includes means to start, stop and rewind in any sequence the recorder of the apparatus in accordance with a code frequency pattern. The code frequency pattern preferably includes a band of voice frequencies and a single frequency outside the band to which the means is responsive.

To illustrate the invention, various embodiments are described hereunder with reference to the accompanying drawings in which—

Figure 1:
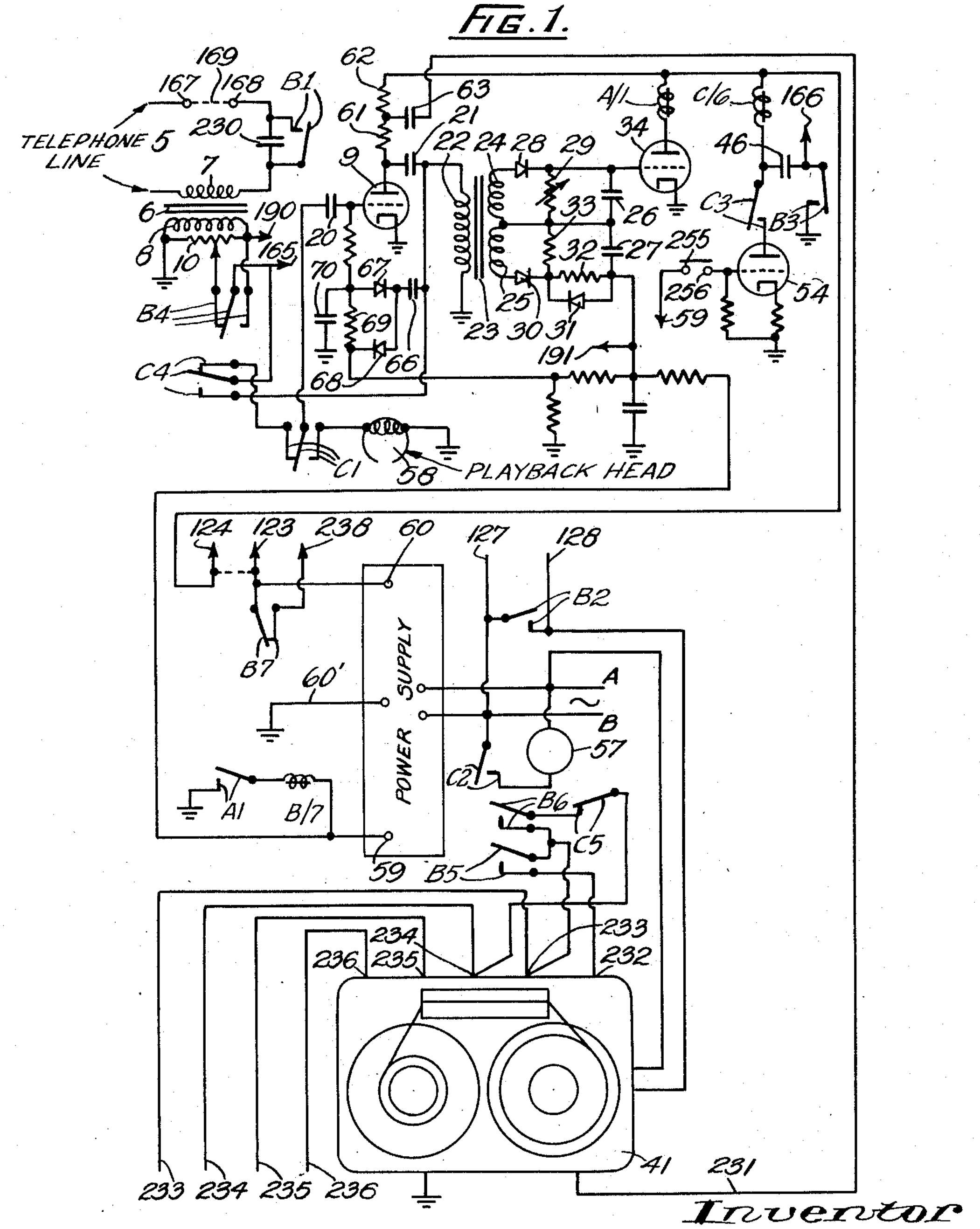
Figure 2:
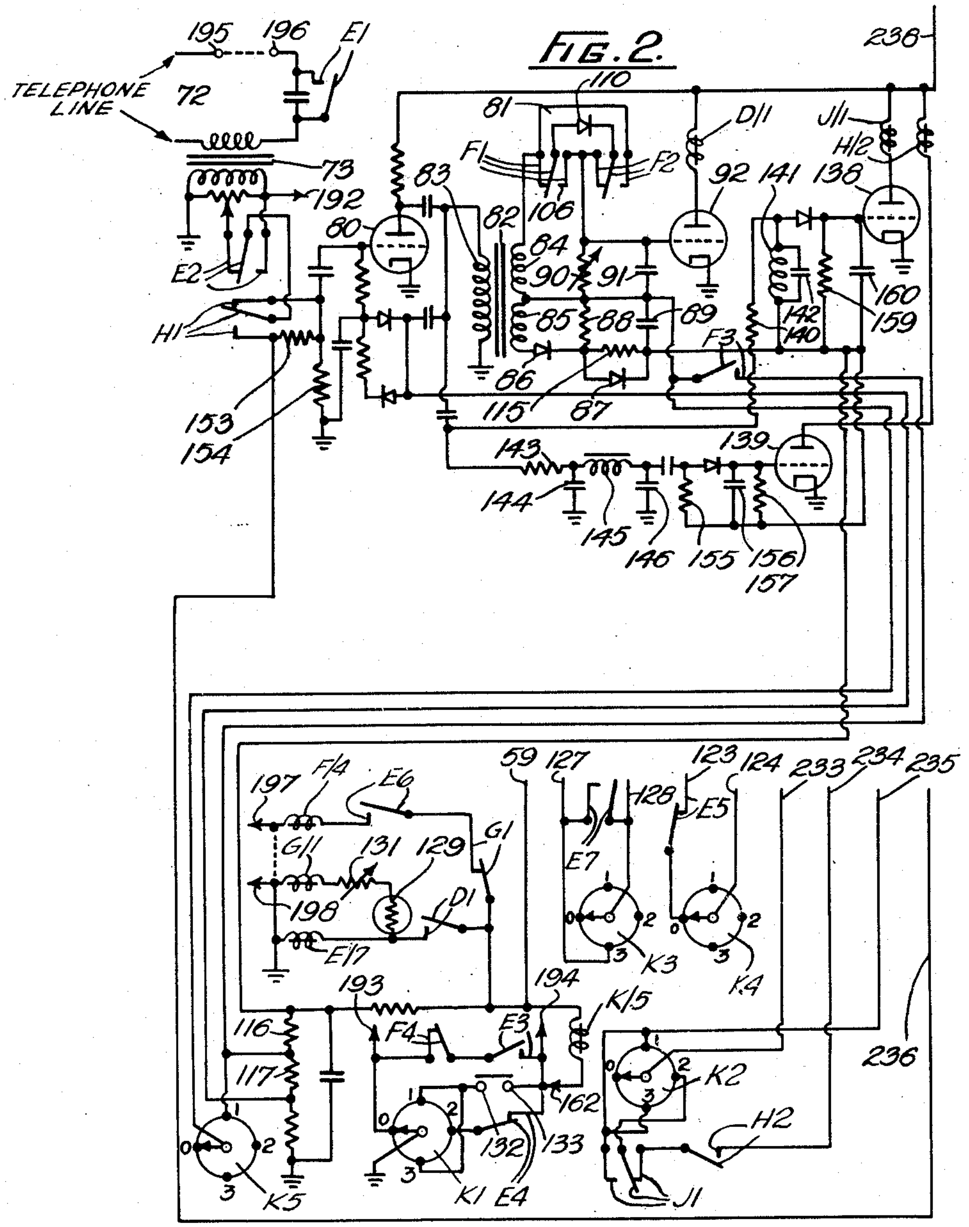
Figure 3:
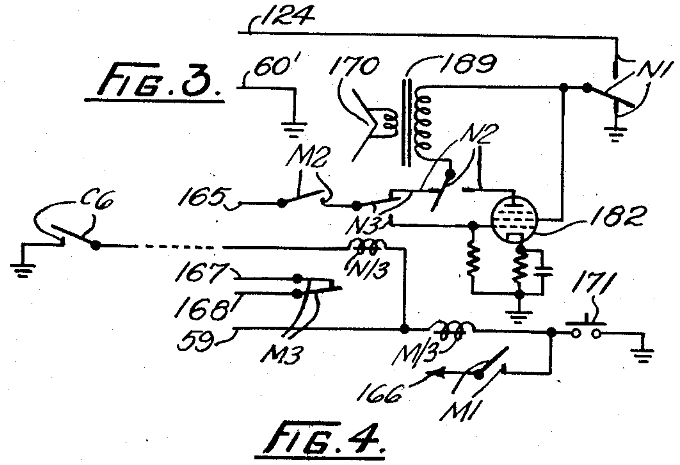
Figure 4:
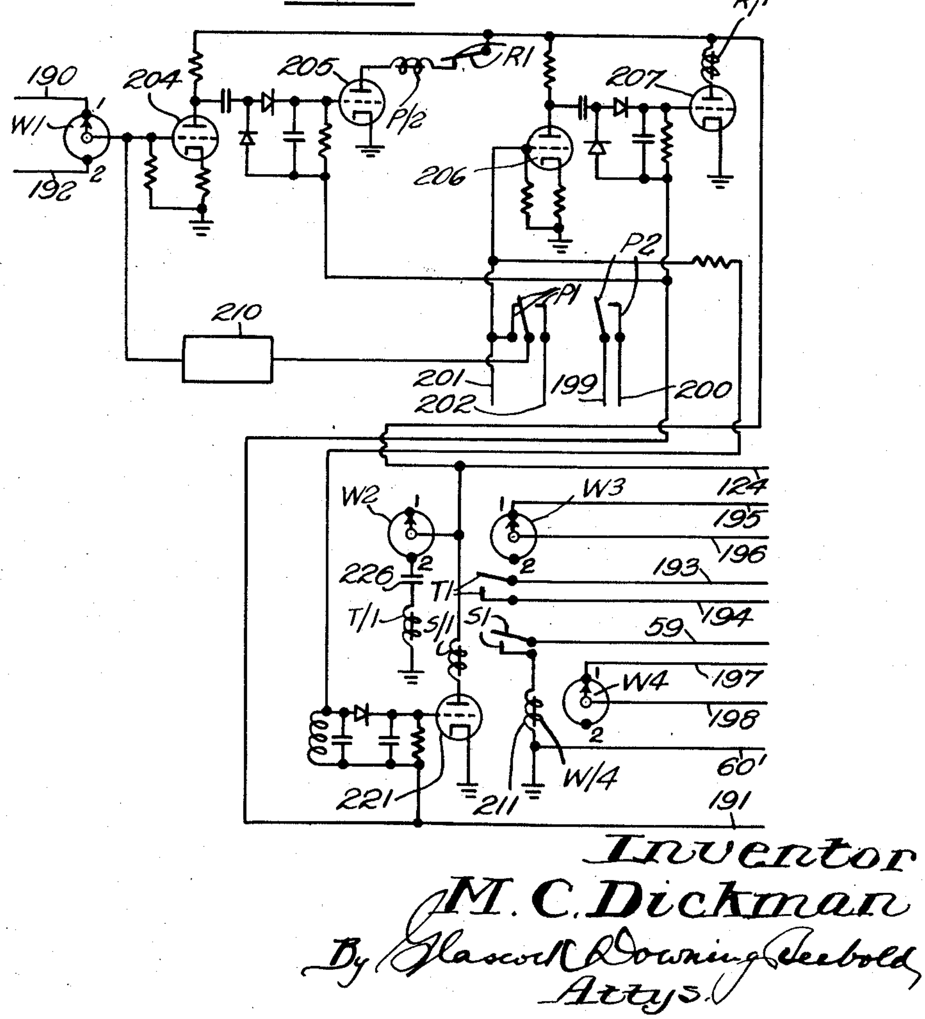

FIGURE 1 is a circuit diagram of an answering/recording unit according to the invention, FIGURE 2 is a circuit diagram of a remote reproducing unit, FIGURE 3 is a circuit diagram of an intercommunication unit for association with FIGURE 1, and FIGURE 4 is a circuit diagram of a transmission control unit for association with FIGURES 1 and 2.

In a first embodiment an answering/recording unit has a circuit diagram as shown in FIGURE 1. In this figure, 5 represents a pair of telephone wires with which the apparatus is associated, the association being via a transformer 6, whose primary 7 is connected across lines 5 in series with a condenser 230. The secondary 8 of the transformer is the path by which signals enter the answering/recording unit to set it in operation. Contact between points 167; 168 is established through a jumper 169 the purpose of which will become clear as the specification progresses.

The recorder 41 may be any known type of dictating machine using a magnetic recording medium and incorporating solenoid operated remote control of the forward, rewind and record/playback functions. As is standard practice with such recording machines all previous recordings are automatically erased while recording is taking place. Detachable and re-usable spools of magnetic tape or wire, or in another form magnetic discs, are used to provide up to several hours of recording at a time. As the principle of these devices is well known no further description is necessary here.

The signal input to the recorder 41 is between line 231 and the common ground connection, line 233 is a common return for energizing the solenoids and relays incorporated in the recorder; connection between this line and lines 232, 234 and 235 produce the following actions. Line 232 switches the recorder from playback to record condition, line 234 controls forward motion of the recording medium and line 235 controls rewinding of the recording medium. Between line 236 and ground appears the reproduced signal used in a reproducing unit to be described later.

Terminal 59 has a negative potential with respect to ground and is used both as a relay energizing supply and a negative bias supply.

Terminal 60 supplies plate power for the valves at a positive voltage with respect to ground. In FIGURE 1, points A and B represent the connection to the A.C. mains network. The power supply contains the normal transformer and rectifiers necessary for the operation of the equipment in question. The heater supply to the valves is conventional and is omitted from the diagram for the sake of clarity.

Assume now that bell ringing pulses are present in the telephone lines 5. These pulses, which are in the form of low frequency alternating current, appear at the grid of an amplifier valve 9 through the circuit including transformer secondary winding 8, potentiometer 10, contacts B4, contacts C4, contacts C1 and condenser 20. These signals are amplified by valve 9 and pass through a condenser 21 to the primary winding 22 of a transformer 23.

Transformer 23 has two secondary windings, 24 and 25. These two windings form part of a detector 24—33 which delivers a positive switching potential to the switching means only when the input signal is of a syllabic nature, e.g. telephone ringing current or speech signals.

The switch means is arranged to operate above a certain threshold potential.

The words syllabic signal as used here refer to an alternating electrical signal that is interrupted at intervals. In other words the signal is not of a continuous nature. Examples of syllabic signals are:

(1) Speech signals, since there are periods of no-signal between the words.

(2) Ringing current on a telephone line.

Examples of non-syllabic signals, i.e. signals of a continous nature are telephone line hum, dialling tone etc.

The detector 24—33 comprises two rectifier circuits 24, 28, 29, 26 and 25, 30, 31, 32, 33, 27, connected in such a way that their D.C. output voltages, which appear across condensers 26 and 27 neutralize each other when both 26 and 27 are equally charged. In other words the two condensers are connected in such a way that when they are equally charged their polarities oppose each other and the net output of the detector is zero or substantially so.

The condenser 26 in the one rectifier circuit is so arranged as to have a fast charge and slow discharge characteristic. The condenser 27 in the other rectifier circuit is arranged to have a slow charge and fast discharge characteristic. The slow charge is achieved by introducing resistance 32 in series with condenser 27 and the fast discharge is achieved by means of diode 31, so connected as to present a low resistance path into resistance 33 during discharge only.

The operation of the detector will now be described in detail with reference to both types of signals i.e. syllabic and non-syllabic.

*Syllabic Signal Input*

During the time when the signal is present 26 becomes fully charged almost instantaneously and 27 starts to charge. Thus a substantial positive potential exists at the output of the detector. Immediately after the commencement of the period of no-signal the small charge that has accumulated on 27 is dissipated very rapidly due to the diode 31. Condenser 26, which has been fully charged while the signal was present begins to discharge slowly at a rate determined by the setting of potentiometer 29.

Thus during the period of no-signal a positive potential still exists at the output of the detector. As soon as the signal reappears the whole cycle will repeat itself i.e. 26 will charge to its full value very rapidly and 27 will begin to charge.

Thus for a syllabic signal input a positive potential exists at the output of the detector, since at all times the potential across 26 exceeds the potential across 27.

*Continuous Signal Input*

Condenser 26 becomes fully charged very rapidly and since the signal is continuous 27 will in due course also become fully charged. The potential across each will be substantially equal. Since the polarities are opposing however the net output potential will be substantially zero.

Going back to a previous paragraph we had ringing current signals in the primary winding of transformer 23. Since these signals have a syllabic nature, a positive potential will appear at the output of the detector. This D.C. potential is applied to the grid of valve 34. The polarity of the rectifier circuits in the detector is so arranged that this D.C. potential reduces the bias on 34. The valve 34 is initially biassed to cut-off i.e. no plate current flows. However, when the output from the detector is sufficient, the bias is decreased until the valve 34 becomes conducting. Plate current flows and relay A/1 is energized.

On automatic exchanges the bell ringing energy is in the form of interrupted wave trains. It is to be noted that where substantially constant ringing is used as in many manual exchanges 26 will initially charge more rapidly than 27 and A/1 will be energized. In both cases the time after which A/1 is energized may be adjusted by means of 10. The time required to charge condenser 26 to a potential sufficiently high enough to energize relay A/1 depends on the amplitude of the D.C. potential applied to it, which in turn depends on the signal amplitude applied to the detector, the latter being regulated by the potentiometer 10. Increasing the signal amplitude by means of potentiometer 10 reduces the time required to charge condenser 26.

It follows that when the bell ringing pulses reach the detector the stage is set for relay A/1 to be energized. As a result of A/1 being energized, contacts A1 close to complete a path from the power supply through a relay B/7. When the coil of relay B/7 is energized certain switching actions take place.

These are:

(*a*) Contacts B2 close to couple a recorder 41 to the electrical supply.

(*b*) Contacts B1 close thereby providing a suitable direct current loop to stop the ringing and hold the exchange circuits.

(*c*) Contacts B4 change-over, providing a direct signal path to winding 8 of transformer 6.

(*d*) Contacts B5 close, switching the recorder from playback to record.

(*e*) Contacts B6 close. These contacts control the forward action of the recorder in conjunction with C5.

(*f*) Contacts B7 open to prevent D.C. plate supply from reaching point 238.

(*g*) Contacts B3 close causing condenser 46 to charge through a circuit including a relay C/6. The capacity of 46 is chosen so that its charging current is sufficient to energize relay C/6.

When the coil of relay C/6 is energised certain further switching actions take place. There are—

(*a*) Contacts C3 close, completing the anode circuit of valve 54 through the coil of relay C/6 to the power supply, as illustrated. The relay C/6 is thus locked by means of the anode current.

(*b*) Contacts C2 close, supplying power to a motor 57.

(*c*) Contacts C1 change over, so that the input circuit of amplifier valve 9 is now connected to a tape playback head 58. A length of magnetic recording tape with the two ends joined or spliced to form a loop is associated with the playback head 58. Any appropriate message is prerecorded on this tape in the conventional way. The speech energy of the pre-recorded announcement on the endless tape, which is operated by motor 57, is fed from the head 58 to the grid of 9 and appears amplified in its anode circuit, a positive D.C. output from the detector is thus produced and the relay A/1 is maintained in an energised condition.

(*d*) Contacts C5 open to prevent the forward action of the recorder taking place until the recorded announcement has ended.

(*e*) Contacts C4 change over to complete a path including the anode circuit of 9 and transformer 6 through contacts B4. The prerecorded announcement is now heard by the caller.

The announcement coming off head 58 is timed to occupy a full rotation of the endless tape, at the end of which a metallic insert in the tape reaches the tape stop contacts 255; 256 and a momentary short circuit is placed across them as it passes. The grid of 54 is then connected momentarily to power supply bias terminal 59, resulting in the cut off of the anode current and the release of relay C/6.

As a result of relay C/6 releasing the following switching operations now occur:

(*a*) Contacts C2 open to switch off the endless tape motor 57.

(*b*) Contacts C1 change over. Similarly, contacts C4 change over. The caller's incoming speech signals on the line 5 now reach the amplifier valve 9 via transformer 6. The amplified speech signals are then fed to the detector 24—33 via coupling transformer 23, producing a D.C. output and thus keeping relay A/1 energized as previously explained. A portion of the amplified speech signals in the anode circuit of 9 is fed to the input of the recorder 41 from the junction of resistance 61 and 62 via condenser 63.

(*c*) Contacts C5 close to complete a path through contacts B6 (these contacts are operated by relay B/7 and since B/7 remains energized these contacts are closed) to energize the customary solenoid controlling forward motion of recorder 41. All incoming sounds are now recorded. It is to be noted that the gain of 9 is controlled by a volume compression circuit including elements 66 to 70, elements 67 and 68 being semi-conductor diodes which rectify signals in the anode circuit of 9 and thus apply an increased bias to its grid. The arrangement of the elements 66 to 70 is such as to regulate the range of current variations in A/1 and the range of levels to the recorder. As long as the caller continues to speak, the syllabic nature of the speech will produce a positive D.C. potential from the detector causing the anode current of 34 to hold relay A/1 in an energized condition. The last mentioned switching condition is thus maintained. If there is no speech on the line, the net D.C. output from the detector will decay and a point will be reached when the anode current in 34 is insufficient to maintain relay A/1 energized. Contacts A1 open is consequence and relay B/7 is released to restore the apparatus to a stand by condition. The time taken for the anode current of 34 to decay from maximum to the drop out point of relay A/1 can be pre-set by means of potentiometer 29, which is normally adjusted to approximately ten seconds to allow for pauses during telephone dictation.

As previously explained, a similar decay in the anode current flowing through A/1 occurs while there is a substantially constant signal on the line. In some countries the moment the calling party rings off, the called person hears a dial tone. Again, in some systems, particularly internal telephone systems, the line may carry a strong hum or buzz after the caller has rung off. These various tones could be of sufficient strength to keep the apparatus in an operative condition. In all these cases the anode current of 34 will decay as previously described, terminating the operation cycle and restoring the apparatus to the initial stand by condition.

In FIGURE 2 there is a circuit diagram of a remote reproducing unit in accordance with the invention. In the circuitry illustrated in FIGURES 1 and 2, the answering/recording unit and remote reproducing unit are adapted for association with one another, the remote reproducing unit being adapted to playback messages on the recorder 41 which is shared by the units.

The remote reproducing unit is coupled to a second set of telephone lines 72, the number of which would normally be known only to the owner of the apparatus. The remote reproducing unit in the embodiment preferably receives its power from the answering/recording unit's power supply and the units are interconnected in such a way as to avoid interference.

When the owner of the equipment dials the private number the bell ringing pulses in lines 72 pass to a detector circuit through transformer 73, contacts E2, contacts H1 and amplifier valve 80 in a manner similar to that described for the answering/recording unit. The detector in the case of the remote reproducing unit includes all the elements of the detector found in the answering/recording unit plus a polarity changing device 81 whose action will be described hereunder.

The D.C. output from the detector causes the anode current of a valve 92 to energize a relay D/1 and as a result of D/1 operating the following switching operation follows: Contacts D1 close to complete a circuit for relay E/7 to be energized via 59.

The energization of relay E/7 initiates the following switching operations:

(*a*) Contacts E1 close to place a D.C. loop across the lines 72, to hold the exchange equipment, and trip the ringing.

(*b*) Contacts E2 change over to provide full sensitivity at the grid of valve 80 to any signals present in lines 72.

(*c*) Contacts E6 close to complete a circuit for the energization of relay F/4 via 59, contacts G1, contacts E6 and 197.

(*d*) Contacts E3 close to prepare the circuit for the energization of stepping relay K/5.

(*e*) Contacts E5 open to break the D.C. plate supply to the answering/recording unit through connections 123 and 124 so that any calls on the lines 5 go unanswered while the remote reproducing unit is in operation.

(*f*) Contacts E7 close to couple the recorder to the mains supply through inter-connections 127 and 128. The recorder now begins to warm up.

(*g*) Contacts E4 open. Their significance will be apparent later on.

The operation of relay F/4 causes the following switching operations to occur:

(*a*) Contacts F1 and F2 in the polarity changing device 81 change over, thus reversing the polarity of diode 110.

(*b*) Contacts F4 are caused to open.

(*c*) Contacts F3 close to put out of action the slow charge/fast discharge portion of the detector circuit consisting of the secondary winding 85 of transformer 82, condenser 89, resistance 88, resistance 115, semi-conductor diode 86 and semi-conductor diode 87. At the same time a lower bias voltage is applied to the grid of valve 92 via junction of resistances 116 and 117. This voltage is so arranged as to keep relay D/1 energized with no signal reaching the detector circuit.

Under the conditions described above a signal appearing on the telephone lines 72 will cause a D.C. potential to appear at the output of the detector circuit which, due to reversal of the polarity of diode 110, causes the plate current of 92 to decrease. Relay D/1 is thus de-energized and the operation cycle is terminated. The hold-in bias on the grid of the valve 92 is adjusted so that low intensity background noises will not trip relay D/1. However, the arrangement is one in which tripping will take place on the occurrence of substantial signals such as noise of the calling party's handset being replaced, speech or dialling tone. This safety device is incorporated as a protection against accidental mis-dialling by a calling party.

A safety period is introduced to guard against a subscriber being accidentally connected to the private number and having the messages on the recorder reproduced to him. During this safety period the polarity of the detector circuit is reversed in 81 and the arrangement is one in which any incoming sounds will cause the unit to be switched off. Hearing the sound pattern that usually accompanies the lifting of the hand-set at the other end of the line but no speech, the subscriber will probably speak. However, if he does not speak but merely replaces his handset during the safety period, the accompanying noise will act to switch the unit off. In order to reproduce the recorded messages, the calling party must remain silent for a period of, say, 15 seconds.

The timing of the safety period is performed by a temperature dependent resistance or thermistor 129. When contacts D1 close, current not only passes to relay E/7 as described earlier, but also to relay G/1. The current flowing in G/1 is limited by the high cold resistance of thermistor 129 and is initially too small to energize G/1. However, the current slowly rises as 129 warms up and after a certain time, adjustable by potentiometer 131, relay G/1 becomes energised. Contacts G1 now open to de-energise relay F/4. The contacts in the polarity reversing device 80 now return to their original positions as do contacts F3 and the detector circuit is restored to its normal condition. Further, contacts F4 close to energise the stepping relay K/5 through a circuit including 59, contacts E3, and position K1/0 of relay K/5 to earth. Relay K/5 now steps to position 1 making the necessary connection through K2/1 to energise the rewind solenoid of the recorder. At the same time the lower bias on valve 92 is maintained by contacts K5/1 of relay K/5 so as to keep relay D/1 energised when contacts F3 open.

Means are preferably incorporated in the recorder so that when the recorder has fully rewound, a pair of contacts 132; 133 are caused to close to energise relay K/5 through 59, K1/1 and ground. The relay K/5 then steps to position 2, where it will remain as long as contacts E4 remain open.

With the stepping relay K/5 in position 2 the starting, stopping and rewind functions of the recorder are controlled by the contacts of relays H/2 and J/1. A further feature of the device is that, being coupled to a second telephone line, it permits the use of a simple tone generator to provide rewind, stop and back-space facilities in addition to remote playback. This tone generator may consist of a pocket-size simple transistor audio oscillator which, when a button is pressed, emits a single, audible note of, say, 2000 cycles per second. This is passed along the line to the reproducing unit by holding the oscillator near the handset microphone. Suitable filters in the unit separate this note from other sounds entering the unit permitting it to actuate a specific relay controlling the rewinding and stopping of the recorder. Another feature of the invention is that the device can make use of a period of silence between each message to control the stopping of the recorder between each message. The user is thus given an opportunity to make notes. In order ot start the recorder again he merely speaks, saying, for example, "proceed with next message." Yet a further feature worth mentioning at this stage is, that at the termination of the call, the recorder can be made to rewind so that only new messages are reproduced on each occasion instead of a person having to listen to information already noted. This feature makes it possible to leave the machine unattended over extended periods without danger of reaching the end of the recording medium. For example, the combination of the units may be used to permit the operation of an unstaffed branch or order depot of a company in another town.

The methods by which the above desirable features are arrived at will become clear in the following paragraphs.

The circuits involving relays H/2 and J/1 are similar and both are sound controlled circuits. Both H/2 and J/1 are in series with the anodes of valves (138 and 139) which are biased to cut off and whose grids are fed from the positive D.C. outputs of rectifier circuits. These latter circuits are capable of cancelling the bias on the valves when excited by signals of suitable frequency and amplitude to cause energizing current to flow in the anode circuits. However, the filters through which the relay circuits are fed differentiate the two circuits.

The circuit controlling relay J/1 is fed through a tuned filter comprising resistance 140, inductance 141 and condenser 142 which is resonant at the frequency chosen for the control of the recorder rewind. This frequency, which is preferably in the region of 2000 c.p.s., will be referred to as the first frequency. The response characteristics of the tuned filter are so arranged that the relay will not be energised by normal speech signals reaching it from the anode circuit of valve 80 but will respond readily to a tone of the first frequency.

In respect of relay H/2, its control circuit is fed through a low pass filter comprising resistance 143, condenser 144, inductance 145 and condenser 146 which will not allow relay H/2 to be energised by signals of the first frequency. However, speech frequencies will readily energise relay H/2.

Should the operator speak, saying, for example, "proceed with message one," relay H/2 will become energised as previously explained. Contacts H2 now close, contacts H1 change over. The forward drive solenoid of the recorder is now energised through the circuit including contacts H2, contacts J1 and K2/2 so that "message one" is heard by the listener from the recorder output through contacts H1, contacts E2, the transformer 73 and lines 72. A portion of this energy also reaches the detector circuit through a voltage divider consisting of resistance 153 and resistance 154, valve 80 and transformer 82. Thus the outgoing speech maintains both relays H/2 and D/1 energised. It will be noted that the bias on 92 has now been restored to normal by the rotation of K5 from K5/1 to K5/2. The time delay in the detector circuit associated with valve 92 is preferably adjusted by means of potentiometer 90 to approximately 30 seconds for reasons which will become clear in the following paragraph.

At the end of each recorded message there follows a space of approximately 10 seconds before the next message due to the time delay of the answering/recording unit. Depending upon the telephone exchange system used, this may be a period of silence or a period of recorded tone such as dial tone. If it is a period of silence and the time constant of condenser 156 and resistance 157 is arranged to be, say, six seconds, relay H/2 will become de-energized approximately four seconds before next message. Contacts H2 will then open to stop the recorder forward drive. Further, contacts H1 change over to render the grid of 80 receptive to incoming signals. At this stage the listener has somewhat less than 24 seconds to make notes, working on the basis of a thirty second time delay as suggested above. He also has the choice of listening to a portion or all of the previous message again if some information has been missed, or he may proceed to the next message. To perform the former operation he causes a tone of the first frequency to pass along the telephone line by means of a battery tone generator or the like, the arrangement being to energise relay J/1. Contacts J1 change over to energise the recorder's rewind solenoid through K2/2. During the rewind, relay D/1 is kept energised by the presence of the first frequency.

The time constant of resistance 159 and condenser 160 is made very short so that the recorder will stop rewinding the moment the tone generator's button is released. If the rewind period is short, relay H/2 will still be energised when J/1 releases. As a result the recorder will proceed to playback immediately after rewind (backspace effect). On the other hand, rewind periods in excess of the six second period suggested above will cause the recorder mechanism to stop when the first frequency ceases. This method of stopping the recorder mechanism can also be used where the space between messages contains dial tone. If the owner wishes to restart the playback mechanism, he merely has to speak to energise relay H/2. The action of the relay is to switch the recorder to playback through contacts H2. By means of the simple procedure set out above the user has complete control over the recorder by remote means.

When the user has noted all the recorded information he requires he replaces his telephone handset. The detector circuit will now lose its charge and relay D/1 will be released after about thirty seconds. The following operations now occur: Contacts D1 open to release relay E/7. Contacts E1 open, removing the short-circuit across lines 72 and contacts E4 close, energising relay K/5 through 59, and K1/2 and ground. Relay K/5 now steps to position 3, energising the recorder's rewind solenoid through K2/3. Rewinding continues until the beginning of the recording medium is reached, closing contacts 132; 133 and causing relay K/5 to switch to position zero through the circuit 59, contacts 132; 133, K1/3 and ground. The recorder drive is now stopped. The short circuit across 127 and 128, which acts to supply power to the recorder, firstly through contacts E7 and then through K3/3, is now removed to switch off the recorder power. Points 123; 124 are now short circuited by K4/0, restoring power to the answering/recording unit and terminating the remote reproduction cycle.

It should be noted that if there are no messages on the recorder, the contacts 132; 133 will be closed. In consequence when relay K/5 steps from 0 to 1 it will step on immediately, to position 2, since in position 1 relay K/5 will again operate via 59, 132, 133, K1/1 and ground. Whether the caller speaks, causing the recorder to playback the first message already heard, or whether he rings off, the cycle will always automatically complete itself as described above.

It will be appreciated that while the apparatus described above employs metallic connection to the telephone line, inductive couplings could be used equally effectively. In the latter, mechanical means might have to be provided to raise or lower the handset cradle of the telephone instrument.

FIGURE 3 illustrates circuitry which enables the unit to be used in association with channels other than telephone lines. When the attachment of FIGURE 3 is used in combination with the device of FIGURES 1 and 2 extra contacts C6 are arranged in the circuit of relay C/6. These contacts are shown in FIGURE 3, for convenience. In addition, interconnection between the apparatus of FIGURES 1 and 3 is effected at points 124, 165, 166, 59 and ground, and to points 167; 168 in FIGURE 1 after the jumper 169 between them has been removed.

In the arrangement under consideration, a loudspeaker 170 is located in a door leading to an office or the like. If a caller finds the door locked and presses a push button 171, a relay M/3 is energised through 59, 171 and ground. As a result of relay M/3 being energised, 166 in FIGURE 1 is grounded through the closure of contacts M1 associated with M/3. Condenser 46 is charged and relay C/6 energised to cause the recorded announcement on head 58 to appear at point 165. Further, contacts C6 close to energise relay N/3 through 59, contacts C6 and ground. The contacts N1 make, contacts N2 make and contacts N3 change over to render valve 182 operative as a power amplifier. The announcement signal at 165 now passes via closed contacts M2 (closed by relay M/3) and contacts N3 to the grid of valve 182, where it is amplified and converted to sound waves by the loudspeaker 170. The caller now hears the announcement. The signal at 165 in FIGURE 3 also passes to the grid of valve 9 in FIGURE 1, charging the detector and energising relay 35 and consequently relay B/7. Contacts B3 in FIGURE 1 close and relay M/3 is locked through a circuit including 59, contacts M1, connection 166 and closed contacts B3. Relay M/3 will therefore remain energised until contacts B3 open, even though press button 171 is released. At the same time contacts M3 open, disconnecting lines 5 from the transformer 6 in FIGURE 1 so that no interference can be caused by an incoming call.

At the termination of the announcement, inviting the caller to leave a message, relay C/6 is released, as described under the description of the arrangement shown in FIGURE 1. In consequence, all the contacts associated with C/6 are restored to their rest position, including contacts C6 which open to release relay N3.

As a result of the release of relay N/3 contacts N2 change over, contacts N3 change over, contacts N1 change over. The loudspeaker 170 is now connected as a microphone to the grid of valve 9 via transformer 189, point 165 and thence to the input to the recorder which is in a recording condition, due to the release of relay C/6. The caller's message is now recorded.

When the caller has finished speaking the detector circuit 3 of FIGURE 1 loses its charge as previously described so that relays A/1 and C/6 are released. When contacts B3 open relay M/3 is also released and the equipment reverts to a standby condition.

It should be noted that the high tension supply for the attachment of FIGURE 3 is fed from point 124 in FIGURE 1 and not directly from point 123, so that the operation of the remote reproducing unit when in use will not be interfered with by callers desiring to leave a message.

An example of how the answering/recording and the remote reproducing units may be actuated by means other than a telephone line is illustrated in FIGURE 4.

The operation principle of this unit may be applied in many different ways, depending on the type of communication apparatus with which it is used and the facilities required. Communication apparatus is used here in its broadest sense and refers to apparatus for intercommunication between any two points, irrespective of the medium employed.

The communication apparatus is preferably switched from a normal "receive" condition to a "transmit" condition by energising a "change-over" relay in the apparatus by placing a short-circuit across a pair of external terminals provided for the purpose.

The transmission control unit of FIGURE 4 will perform the following functions:

(*a*) If the owner has his receiving apparatus switched on and is listening at some remote point within the range of the communication apparatus he will be warned that his answering/recording unit has been actuated by any of the possible means previously mentioned and that a calling party is about to leave a message.

(*b*) The owner is then able to listen to the calling party speaking and is further able to interrupt and converse with the calling party.

(*c*) If the owner is temporarily absent from the receiving apparatus when the calling party leaves his message, he is able, after switching on his transmitting apparatus, to press a button or the like which causes a tone of a specific frequency to be received by the receiving portion of the communication apparatus the latter being associated with the transmission control, answering/recording and remote reproducing units. Thus the remote reproducing units can be brought into operation to transmit to him messages which were recorded by the answering/recording unit in his absence. The circuit of FIGURE 4 can be employed where the communication apparatus can handle speech in only one direction at a time, such as when a single radio carrier frequency is allocated for both reception and transmission.

Interconnections are established between the units of FIGURES 1, 2 and 4 at the points 190, 124, 59, 191 (see FIGURE 1) and 192, 193, 194, 195, 196, 197 and 198 (see FIGURE 2). Connections made to the communication apparatus are as follows: Points 199, 200 to a receive/send relay, point 201 to the output of the receiver and point 202 to the audio frequency input to the transmitter. As with the apparatus and circuitry previously described, relays are shown in their "standby" or unenergised condition.

Let us assume that lines 5 in FIGURE 1 and lines 72 in FIGURE 2 are in fact telephone lines, that the communication in this case is by means of radio frequency, that the communication apparatus connected to the transmission control unit is a fixed transmitter-receiver and that the remote communication apparatus is a mobile transmitter-receiver installed, for example, in the owner's car.

In FIGURE 4, the circuitry involving valves 204 and 205, and that involving valves 206 and 207, will be recognised as voice controlled relay circuits similar to those previously described. The time constants of both rectifier circuits are very short so that relays P/2 and R/1 will operate within a few milliseconds after receiving a signal and will drop out, say, one second after the signal has ceased. A delay network 210 introduces an average signal delay of about 20 milliseconds in order to prevent P/2 and R/1 operating simultaneously.

Consider now a bell ringing pulse appearing at 190 in FIGURE 1 and setting the answering/recording unit in operation. Due to the interconnection, this signal also appears at the grid of valve 204 in FIGURE 4, through contacts W1/1 of a two position stepping relay W/4. Relay P/2 is thus energised.

As a result of relay P/2 operating:

(*a*) Contacts P1 change over to prevent the signal from reaching the grid of valve 206.

(*b*) Contacts P2 close and cause the transmitter to be energised.

Any signal appearing at point 190 will now be fed through to the input of the transmitter 202, via W1/1, 210 and contacts P1. The signal will thus be transmitted and the remote receiver in the owner's car will pick it up. The owner, sitting in his car will thus be enabled to hear the outgoing announcement given by the answering/recording apparatus of FIGURE 1, to the caller and the caller's speech.

However, during each pause in the caller's speech relay P/2 releases to allow the communication equipment to revert momentarily to the receiving condition. During any such pause, the owner may interrupt by speaking into his mobile transmitter. This speech will then be transmitted and will be received at the fixed transmitter/receiver, whereupon his speech passes from the receiver output 201 to the grid of valve 206. Relay R/1 is thus energized and contacts R1 open to prevent relay P/2 from operating.

The owner's speech also passes from the receiver output 201 via contacts P1, element 210 and contacts W1/1 to 190 and thence to lines 5 to be heard by the caller. Since the owner in his car and the caller will then be able to converse with each other, the owner can explain to the caller that they are speaking over a radio link and the conversation can proceed. The answering/recording unit will maintain the calling party's connection as long as there are speech signals present at 190, and if the recorder is connected, the conversation will also be recorded.

If the owner is absent, or if his mobile receiver is switched off during the call, he may later actuate the remote reproducing unit and listen to the recorded messages in the following manner.

Referring to FIGURE 4, the circuitry of valve 221 will be recognised as a tuned signal relay similar to valve 138 in FIGURE 2. The resonant frequency chosen for this purpose is preferably in the region of 4 kc./s. and will be referred to as the second frequency.

The remote mobile transmitter is fitted with a suitable oscillator so that when a button is pressed the transmitter will be modulated by a signal of the second frequency which is received and passed via 201 to the signal relay in FIGURE 4. Relay 5/1 is thus energised and contacts S1 close to energise relay W/4 through 59, contacts S1 and ground. Relay W/4 now steps to position 2, whereupon the following switching operations take place.

(*a*) The transmission control unit switches from 190 in the answering/recording unit to point 192 in the remote reproducing unit.

(*b*) Contacts W4/2 open interconnections 197 and 198 in FIGURES 2 and 4 to prevent relay F/4 from being energised.

(*c*) Contacts W3/2 open interconnections 195 and 196 in FIGURES 2 and 4, breaking the line connection to lines 72.

(*d*) Relay T/1 becomes momentarily energised by the charging current of a condenser 226 through 124, W2/2, relay T/1 and ground. Contacts T1 now close, connecting points 193 and 194 to energise stepping relay K/5 in FIGURE 2 through 59, 162, 193, 194, K1/0 and ground. Relay K/5 is thus caused to step to position 1 to rewind the recorder.

Thereafter the owner can remotely control the recorder, as described under the description of the remote reproducing unit. The speech energy from the recorded messages passes via 192 in FIGURE 2 to 192 in FIGURE 4 and thence via W1/2, 210, contacts P1 to the transmitter input 202. The recorded messages from the remote reproducing unit are thus transmitted and picked up by the remote receiver. When the owner has heard the messages he presses the button to energise relay S/1, which again closes contacts S1 which causes relay W/4 to step back to position 1 and terminate the cycle.

From the above description, it will be apparent to those skilled in the art that the device of the invention is of a comparatively simple nature and in comparison to most known recording and reproducing units of the kind in question, it is a lot less bulky. In fact a unit according to the invention is as easily transportable as most types of portable typewriter. Also, in spite of the simple nature of the device, it provides facilities not offered by other devices e.g. complete remote control of the recorder and the ability of the owner in a moving vehicle to converse with a subscriber on a telephone network.

I claim:

1. An automatic answering, recording and reproducing machine for a telecommunications system including detector means responsive to signals in a signal channel, recording and reproducing apparatus, and switching means responsive to the output from the detector means serving to connect the recording and reproducing apparatus to the signal channel, the detector means comprising two rectifier circuits, an output load including a reservoir condenser connected across each rectifier circuit, means included in one of the loads to provide its condenser with a fast charge/slow discharge characteristic, and means included in the other load to provide its condenser with a slow charge/fast discharge characteristic, the outputs of the two rectifier circuits being connected in polarity-opposition to allow the charge across the slow charge condenser to subtract from the charge across the fast charge condenser with the result that with the appearance of a syllabic signal in the signal channel the output of the detector is substantially equal to the potential across the load having the fast charge condenser since there is insufficient time for the slow charge condenser to accumulate a charge, whereas with the appearance of a continuous signal in the signal channel the output of the detector decreases to substantially zero due to the subtraction of the charge on the slow charge condenser from the charge on the fast charge condenser.

2. An automatic answering, recording and reproducing machine for a telecommunications system including detector means responsive to signals in a signal channel, recording and reproducing apparatus, switching means responsive to the output from the detector means only when the output exceeds a predetermined threshold value, acting to connect the recording and reproducing apparatus to the signal channel, means to vary the time taken by the detector output to reach the threshold value and means for providing a predetermined time delay between the cessation of signals in the signal channel and the termination of energisation of the switching means, the detector means comprising two rectifier circuits, an output load including a reservoir condenser connected across each rectifier circuit, means included in one of the loads to provide its condenser with a fast charge/slow discharge characteristic, and means included in the other load to provide its condenser with a slow charge/fast discharge characteristic, the outputs of the two rectifier circuits being connected in polarity-opposition to allow the charge across the slow charge condenser to subtract from the charge across the fast charge condenser with the result that with the appearance of a syllabic signal in the signal channel the output of the detector is substantially equal to the potential across the load having the fast charge condenser since there is insufficient time for the slow charge condenser to accumulate a charge, whereas with the appearance of a continuous signal in the signal channel the output of the detector decreases to substantially zero due to the subtraction of the charge on the slow charge condenser from the charge on the fast charge condenser.

3. An automatic answering, recording and reproducing machine as claimed in claim 2 in which the means to vary the time taken by the detector output to reach the threshold value consists in a variable resistor connected ahead of the input to the detector means adapted to control the amplitude of the signal applied to the detector which in turn controls the charging time of the reservoir condensers.

4. An automatic answering, recording and reproducing machine as claimed in claim 2 in which the means for providing a predetermined time delay between the cessation of signals in the signal channel and the termination of energisation of the switching means consists in a variable resistor in the load having the fast charge condenser adapted to control the discharging time of that condenser.

5. An automatic answering, recording and reproducing machine as claimed in claim 2 in which the recording and reproducing apparatus has a recording medium which is normally not in motion, means to record at least one message on the medium, means to move the medium in a forward direction, means to reproduce the message on the signal channel to a remote party and means to rewind the recording medium, and including a band-pass relay responsive to speech signals in the signal channel adapted to actuate the means to move the medium in a forward direction to effect reproduction to the remote party, and a tuned relay responsive to one specific frequency in the signal channel transmitted by the party at any time during the reproduction cycle adapted to actuate the means to rewind the recording medium so that any portion of the message may be repeated.

6. An automatic answering, recording and reproducing machine as claimed in claim 5 including means to prevent unauthorised reproduction of the recorded message on the signal channel, comprising means to reverse the polarity of the rectifier having the fast charge condenser for a predetermined period of time when the detector output exceeds the threshold value, means to restore the polarity of the rectifier to its original state if no signal arrives at the detector during the period, and means to disconnect the recording and reproducing apparatus from the signal channel if a signal arrives at the detector during the period.

7. An automatic answering, recording and reproducing machine for a telecommunications system including detector means responsive to signals in a signal channel, recording and reproducing apparatus, switching means responsive to the output from the detector means only when the output exceeds a predetermined threshold value, acting to connect the recording and reproducing apparatus to the signal channel, means to vary the time taken by the detector output to reach the threshold value and means for providing a predetermined time delay between the cessation of signals in the signal channel and the termination of energisation of the switching means, the detector means comprising two rectifier circuits, an output load across the first rectifier comprising a reservoir condenser shunted by high resistance and having a low resistance in the charging path of the condenser so that the condenser has a fast charge/slow discharge characteristic, an output load across the second rectifier circuit comprising a second reservoir condenser, a high resistance in the charging path of the second condenser and the low forward resistance of a diode in its discharging path so that the second condenser has a slow charge/fast discharge characteristic, the outputs of the two rectifier circuits being connected in polarity-opposition to allow the charge across the slow charge condenser to subtract from the charge across the fast charge condenser, 8. An automatic answering, recording and reproducing machine as claimed in claim 7 in which the means to vary the time taken by the detector output to reach the threshold value consists in a variable resistor connected ahead of the input to the detector means adapted to control the amplitude of the signal applied to the detector, which in turn controls the charging time of the reservoir condensers.

9. An automatic answering, recording and reproducing machine as claimed in claim 7 in which the means for providing a predetermined time delay between the cessation of signals in the signal channel and the termination of energisation of the switching means consists in a variable resistor in the load having the fast charge condenser adapted to control the discharging time of that condenser.

References Cited in the file of this patent

UNITED STATES PATENTS

| | | |
|---|---|---|
| 2,515,968 | Shanklin | July 18, 1950 |
| 2,523,914 | Molnar | Sept. 26, 1950 |
| 2,537,407 | Handschin | Jan. 9, 1951 |
| 2,577,755 | Hargreaves | Dec. 11, 1951 |
| 2,608,608 | Handschin | Aug. 26, 1952 |
| 2,665,337 | Handschin | Jan. 5, 1954 |
| 2,778,876 | Gordon | Jan. 22, 1957 |
| 2,799,726 | Van Deventer | July 16, 1957 |
| 2,815,401 | O'Dwyer | Dec. 3, 1957 |
| 2,816,167 | Muller | Dec. 10, 1957 |
| 2,835,737 | Shively | May 20, 1958 |
| 2,881,252 | Zimmerman | Apr. 17, 1959 |